Dec. 20, 1949     E. C. CROWTHER     2,492,114
STUD RETAINER
Filed Nov. 3, 1944
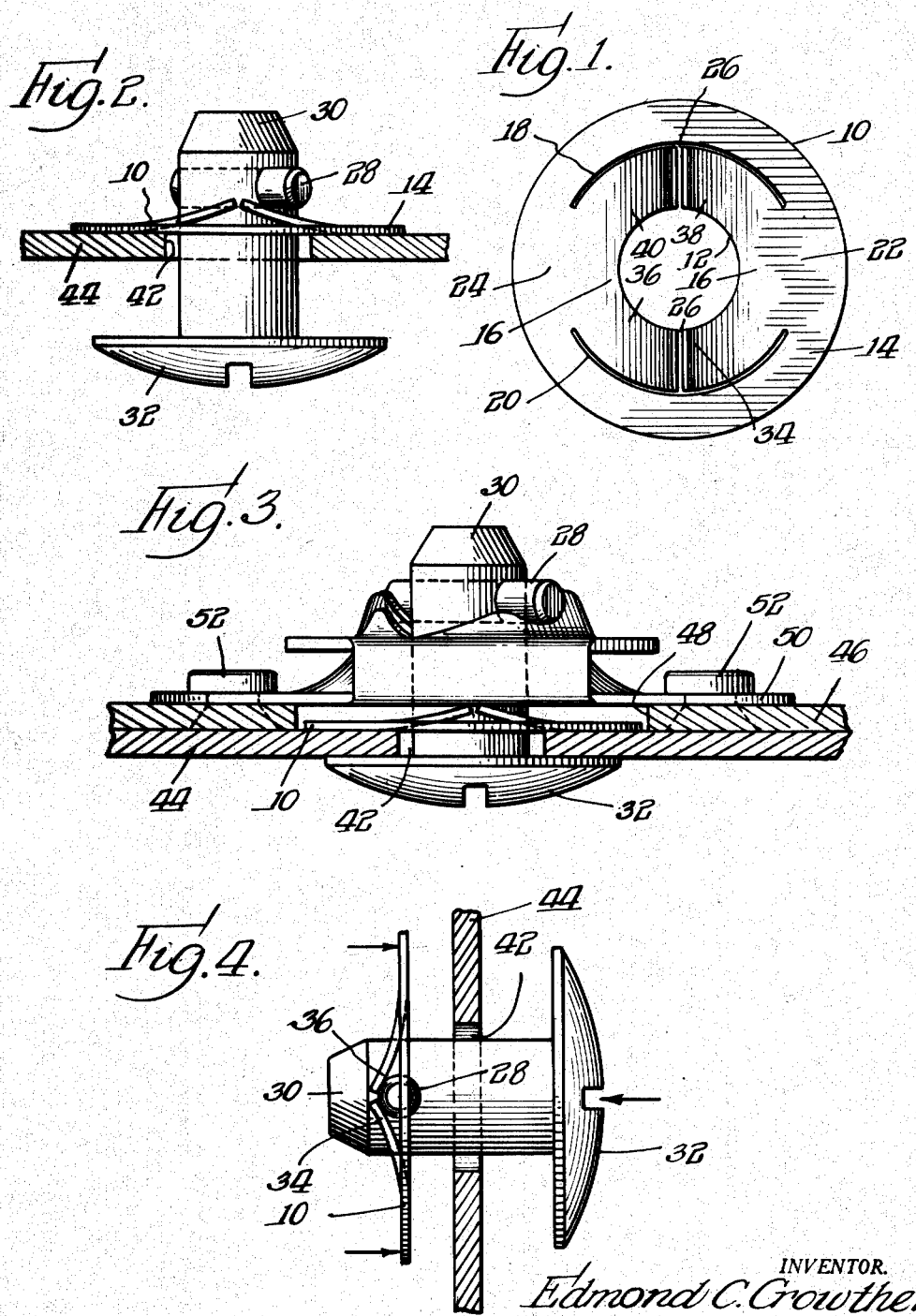

Patented Dec. 20, 1949

2,492,114

UNITED STATES PATENT OFFICE 2,492,114

STUD RETAINER

Edmond C. Crowther, Philadelphia, Pa., assignor to Illinois Tool Works, Chicago, Ill., a corporation of Illinois Application November 3, 1944, Serial No. 561,735

1 Claim. (Cl. 24—221)

The present invention relates to a stud retainer, and more particularly to a snap-on washer-like retainer for cooperation with fastener studs of the type having adjacent one end transversely projecting members.

Fastener studs of the type commonly used in connection with cowl fasteners in airplane construction and other similar construction, are generally of the type having a cylindrical body with a head at one end and transversely arranged diametrically opposite projecting members adjacent the other end. A fastener stud of this type is passed through a suitable opening in a body or cover which is to be fastened or secured in position relative to another body. In one type of construction the opening in the cover or body is approximately equal to the sum of the diameter of the body of the stud and the length of one of the projecting members adjacent the end of the stud. To insert a stud into such opening the stud is tilted so as to pass one of the projecting cross members through the opening and then the pin may be straightened and the other projecting member passed through the opening. Such an arrangement has the disadvantage that when a cover or the like is removed and handled, the fastener studs may drop out from these openings and become lost.

In other types of construction the opening or hole for the body of the fastener stud is slightly larger than the diameter of the stud to provide for alignment of the stud with its cooperating fastener. The opening may be smaller than the opening heretofore described, and hence the transverse projecting cross members comprise a pin which are inserted in a position by a suitable tool after the end of the stud has been inserted through an opening. In such an arrangement there is no likelihood of the fastener stud becoming lost but the labor involved in installation is so great as to constitute a distinct disadvantage. It, therefore, is apparent that it would be highly desirable to provide a simpler manner of retaining the stud in position which would obviate the above mentioned disadvantages. In accordance with the present invention, there is provided a retainer for holding fastener studs in position in a work piece cover or sheet prior to affixing the same to the openings to be covered and while such covers are being handled. Such retainer is arranged to be applied to the stud by snapping the retainer beyond the transversely projecting members adjacent the end of the fastener stud. The retainer is so formed that the mechanic who is placing the stud in position may operate rapidly and efficiently largely by feel. Furthermore such retainer is formed so that when the retainer is once snapped on to a stud, there is no likelihood of accidental removal of the retainer and further the retainer has sufficient rigidity as to substantially preclude the removal of the retainer by force.

It therefore is an object of the present invention to provide an improved type of stud retainer which is readily applied thereto without tools and without special manipulation.

Still another object of the present invention is to provide an improved stud retainer for use with a stud of the type having adjacent one end transversely arranged projecting members which may be rotated on the end of the stud so that the projecting members tend to seek the proper position relative to the retainer for application of the retainer.

Still another object of the present invention is to provide an improved stud retainer so formed that when the retainer has been applied to the stud, that the retainer will tend to orient itself relative to the transverse projecting members of the stud so as to preclude removal of the stud.

Other and further objects of the present invention subsequently will become apparent by reference to the following description taken in connection with the accompanying drawing wherein Figure 1 is a plan view of a stud retainer constructed in accordance with the present invention;

Figure 2 is a side view of the retainer and adjacent work sheet or cover with a stud retainer in operative position;

Figure 3 illustrates the manner in which the stud retainer may be used with a cowl fastener without interfering with the operation thereof; and Figure 4 illustrates the manner in which the retainer of the present invention is applied to a fastener stud.

In Figures 1 and 2 of the drawing there is shown a retainer 10 comprising a generally flat washer-like member having a central aperture 12, an outer rim portion 14, and an intermediate portion 16. The intermediate portion 16 is partially severed from the rim 14 along two arcuate lines 18 and 20 symmetrically arranged opposite each other so as to leave supporting areas 22 and 24. The intermediate portion 16 is severed along a diametrical line 26 which line bisects the angles of the arcuate lines 18 and 20. Thus the intermediate portion is formed into four resilient fingers capable of being flexed to permit passage of projecting transverse members 28 adjacent the end of the body 30 of a stud fastener having a head 32. The intermediate portions 16 adjacent the transverse line 26 are formed so that the ends of the fingers are displaced upwardly from the plane of the rim 14 as is readily apparent from the side view in Figure 2. Preferably the four fingers 34, 36, 38, and 40 are so arranged or formed that the ends of adjacent fingers such as 34, 36, and 48, 40 are so close together as to preclude orientation of the cross members 28 of the fastener stud 30 after the fastener has been applied to the fastener stud.

The fingers 34, 36, 38 and 40 have been shown as being formed upwardly from the plane of the rim 10 so as to form an obtuse angle between pairs of fingers along the diametrical severing line 26. Obviously of course other configurations besides that shown in Figure 2 may be employed provided that the same function is served as has been described and as will become more fully apparent subsequently. The resilient fingers 34, 36, 38 and 40 of the intermediate portion 16 preferably have such resiliency as to permit flexing in a direction to permit the passage of the retainer 10 over the cross members of the fastener stud. They also have such rigidity to the movement of a fastener in the opposite direction as to substantially preclude removal therefrom without permanent deformation or destruction of the fastener.

While for purposes of illustrating the general type of stud fastener used, the transversely projecting members 28 have been shown as being of the type which are inserted into a suitable opening adjacent the end of the body 30, it will be appreciated that the transverse members 28 may be formed integrally or otherwise provided so as to extend on opposite sides of the body of the stud. The stud fasteners of this type are commonly used in connection with cowl fasteners in aircraft construction.

The stud fastener, comprising the cross members or projecting elements 28, the body 30, and the head 32, is shown in Figure 3 in position in an aperture 42 in a cover or sheet of material 44. The cover of sheet of material 44 is shown placed adjacent another body 46 forming a portion of the surrounding surface adjacent an opening which is to be closed by the cover 44. The body 46 is provided with an aperture 48 adjacent which there is positioned a cowl fastener 50. This cowl fastener may be any one of a number of suitable types readily available for cooperation with a fastener stud of the type shown including those disclosed in U. S. Letters Patent 2,314,368 and 2,324,260. The fastener 50 is suitably secured to the plate 46 by rivets 52. The opening 48 in the plate 46 which is arranged coaxially with the opening in the cowl fastener 50 is formed with a diameter slightly in excess of the maximum dimensions across the cross pin 28 of the stud fastener supported from the cover 44. It will be seen from Figure 3 that the stud fastener retainer 10 readily fits within the opening 48 of the plate 46 without interfering with the operation of the fastening device so that the use of the present stud retainer does not require any modification in the construction of the application of the fastener stud or the cowl fastener which is to cooperate therewith.

It may be assumed that the opening 42 in the cover or plate 44 is of such dimension that the stud fastener may be inserted therethrough by tilting the body 30 so that one of the projecting members 28 is first inserted through the opening 42, and thereafter by straightening the position of the body 30, the other projecting member 28 is also passed through the opening 42. With the stud fastener in such position as is shown in Figure 4 a retainer is applied to the end of the body 30 with the concave side toward the cross pins or projecting members 28. Thereupon the washer is rotated relative to the stud fastener until the cross pins 28 are located adjacent the ends of the fingers 34, 36, and 38, 40. Thereupon a force is applied to the head 32 of the stud in the direction of the arrows shown and a force is applied to the rim 14 of the retainer 10 in the opposite direction to cause flexure of the fingers 34, 36, 38, and 40, to permit passage of the cross pin 28 through the retainer 10. The fingers 34, 36, 38, and 40 are sufficiently resilient as to permit passage of the cross pin 28 without deformation of the fingers and to return to their normal position.

Due to the fact that the fingers 34, 36, 38 and 40 are curved in the manner shown so as to form substantially the vertex of an obtuse angle, the one side of the retainer 10 is concave in part so as to assist in ready location of the cross pin 28 of the stud fasteners and to guide and admit the cross pin when pressure is applied to the retainer thereby facilitating rapid assembly of the parts. Thus, the fingers 38, 40 are inclined toward each other, as are the fingers 34, 36, to form at one side of the retainer locating recesses which facilitate rapid location of the projections 28 during assembly and the inclination of the fingers on the opposite side of the retainer serves to resist alignment of the projections with the spaces between the fingers after assembly in that the curvature of the spring fingers causes the washer 10 to seek to orient the cross pins of the stud fastener at right angles to the adjacent surfaces of the fingers formed by the diametrical severance line so that the cross pin rests adjacent the supporting areas 22 and 24, and hence even with very rough handling of the cover 44 there is no possibility of the fastener stud becoming disengaged from the retainer and from the cover. It will further be appreciated that by virtue of the fact that the fingers are closely adjacent and form substantially the vertex of an obtuse angle, that great difficulty will be experienced in removing the retainer so that such retainer even with the use of force will probably not be removed without destroying or permanently deforming the retainer. Thus a maximum amount of security for retaining a stud fastener is obtained.

The stud retainer shown in the drawing has been illustrated as having a flat rim portion 14 which, however, may be strengthened by an annular corrugation or by a beaded rim if additional rigidity is deemed desirable. The resilient fingers which permit passage of the retainer over the transverse projecting members of the fastener stud have been shown as curving upwardly to form substantially the vertex of an obtuse angle. Other arrangements and configurations of the resilient fingers might be provided which would permit the passage of the projecting cross members of the fastener stud and yet tend to orient the cross members in the proximity of the supporting positions so as to provide the maximum of security.

While a certain preferred embodiment has been shown for the purpose of describing and illustrating the present invention, it is to be understood that the invention is not to be limited thereby since such variations and modifications may be made in the structure and the configuration thereof as are commensurate with the spirit and scope of the invention defined in the following claim.

This invention is hereby claimed as follows:

In combination with a headed stud fastener having a shank and an apertured work piece through which the stud shank extends, said stud fastener having oppositely positioned projections extending outwardly from the shank and positioned on the side of the work piece oppositely disposed from the head, and a snap-on retainer positioned intermediate the work piece and stud projections, said snap-on retainer including a sheet metal washer member having an outer rim portion, a central stud receiving opening, and an intermediate portion supported by said outer rim and extending circumferentially within said rim portion and severed at diametrically opposite positions to present opposed pairs of readily flexible fingers having the free extremities thereof inclined in the same direction out of the plane of the washer rim toward said projections and with the adjacent free extremities of each pair of fingers inclined toward one another to form locating recesses at one side of the retainer to facilitate rapid location of the projections therein for assembly, the said adjacent free extremities of each pair of fingers at each diametrically opposite position being spaced apart less than the diameter of a projection and located so as to require temporary lateral deflection and consequent separation at their extremities when engaged by opposed stud projections during telescopic assembly of the parts, whereby to permit passage of said stud projections between the said fingers, and the inclined surfaces of said fingers at the opposite side of the retainer resisting alignment of the projections with the spaces between the said fingers after assembly.

EDMOND C. CROWTHER.

REFERENCES CITED

The following references are of record in the file of this patent:

UNITED STATES PATENTS

| Number | Name | Date |
| --- | --- | --- |
| 490,435 | Hall | Jan. 24, 1893 |
| 558,398 | Lettre | Apr. 14, 1896 |
| 1,323,188 | Humphris | Nov. 25, 1919 |
| 1,715,883 | Adams | June 4, 1929 |
| 1,726,972 | Zinnbauer | Sept. 3, 1929 |

FOREIGN PATENTS

| Number | Country | Date |
| --- | --- | --- |
| 379,787 | Great Britain | Sept. 8, 1932 |